March 25, 1930.  J. CUNNINGHAM  1,751,509
ELECTRIC SOLDERING MACHINE
Filed March 30, 1927   6 Sheets-Sheet 1
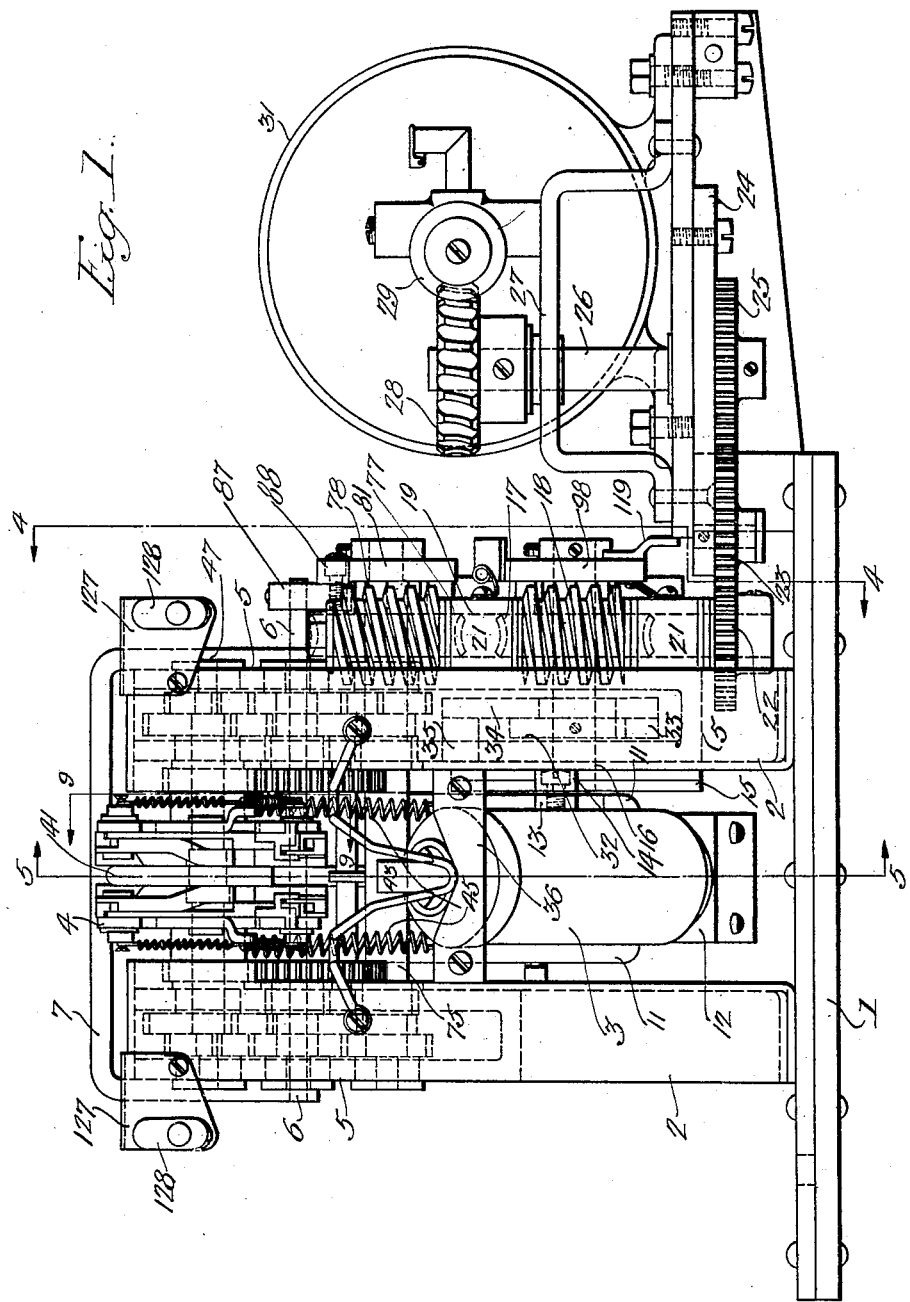

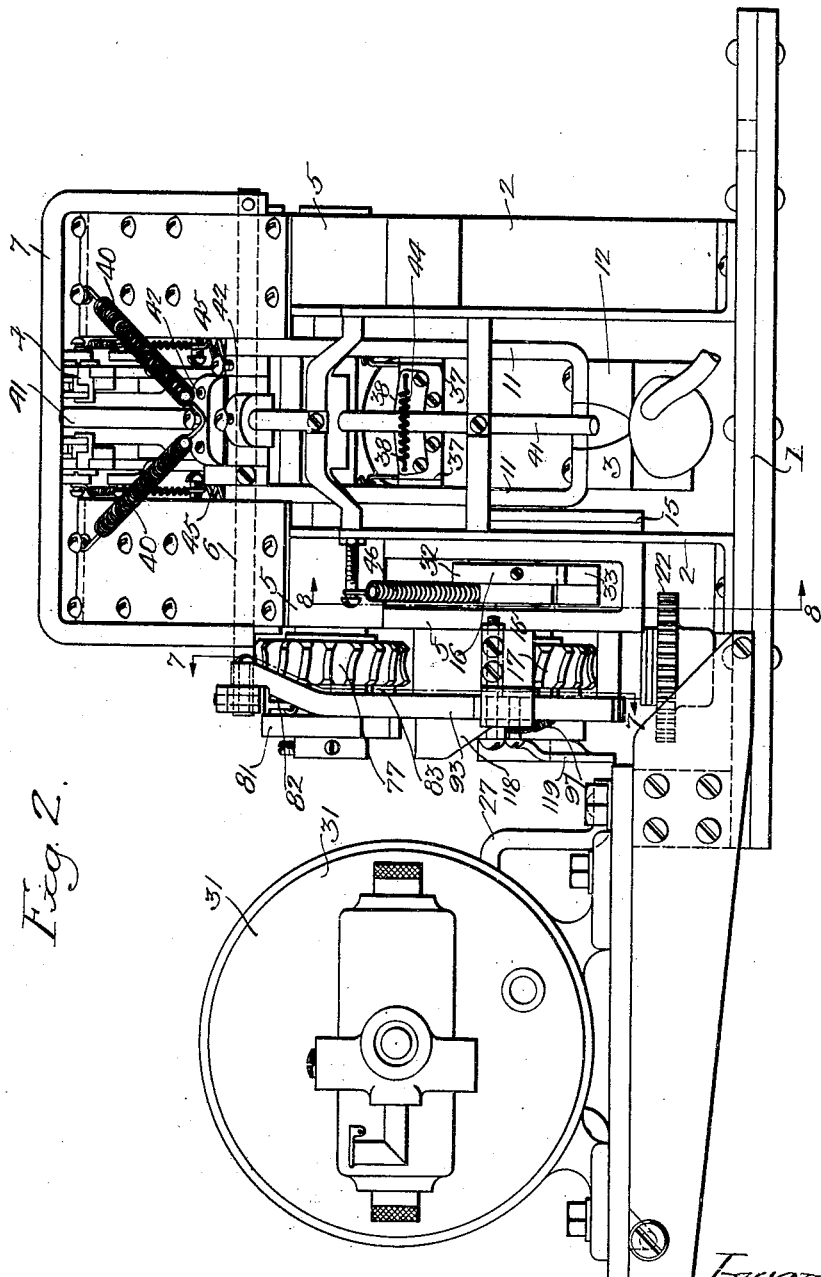

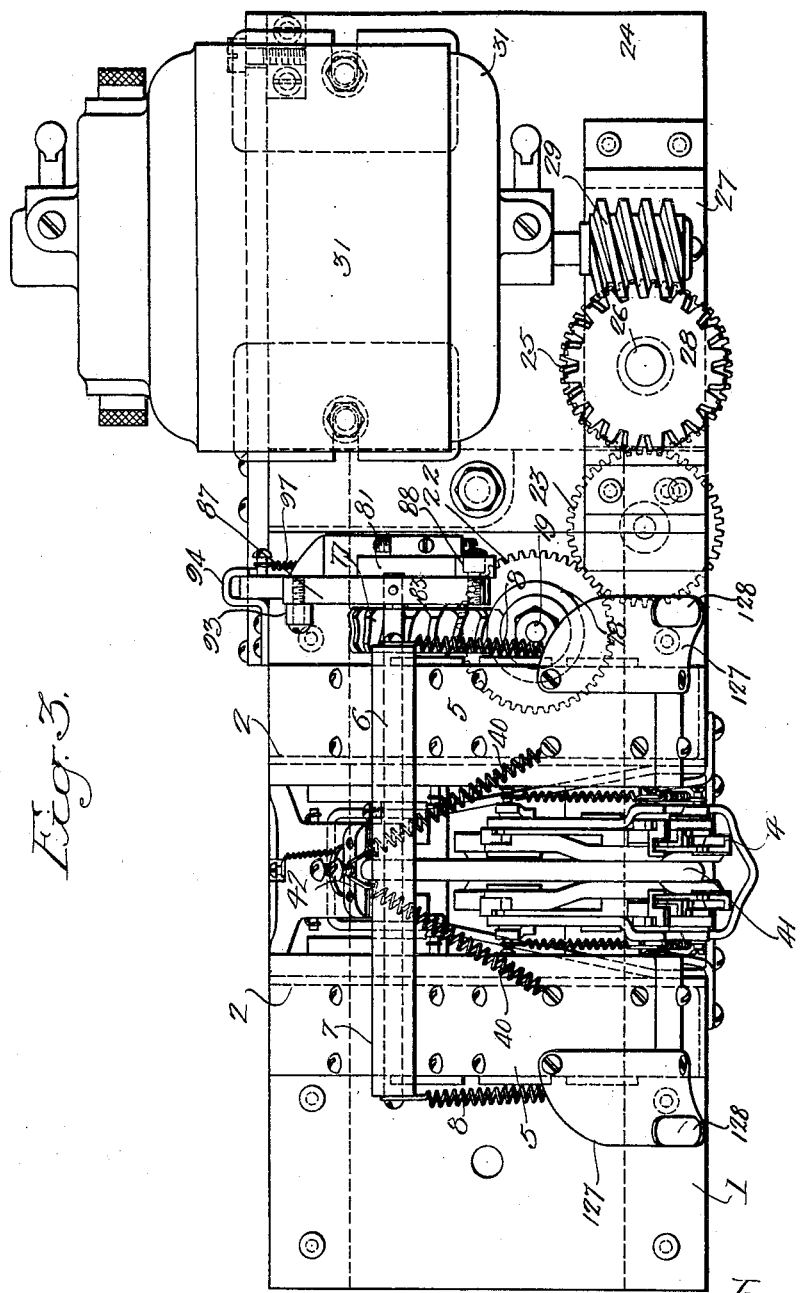

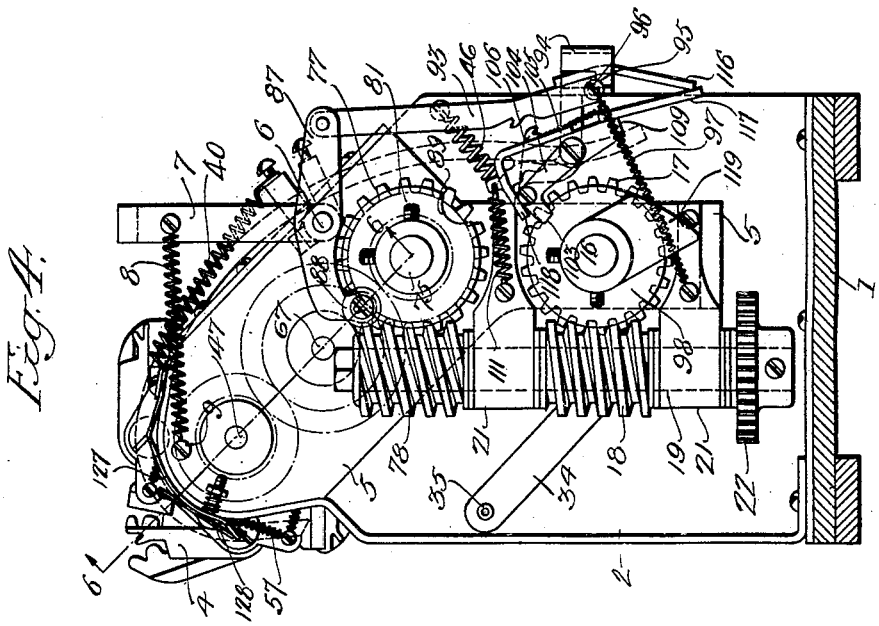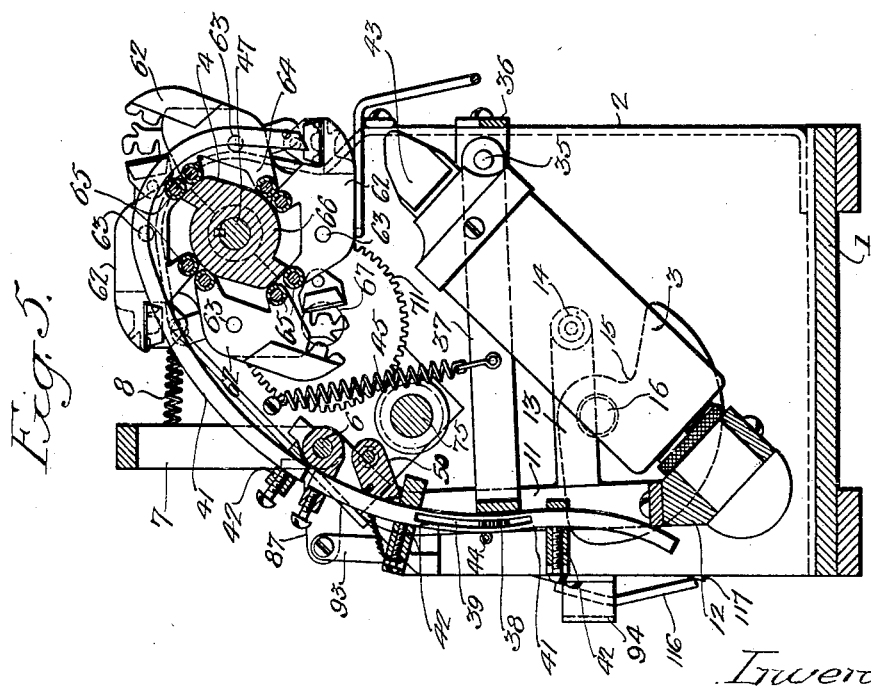

March 25, 1930.  J. CUNNINGHAM  1,751,509

ELECTRIC SOLDERING MACHINE

Filed March 30, 1927   6 Sheets-Sheet 5

Inventor;—
James Cunningham,
by his Attorneys
Howson & Howson

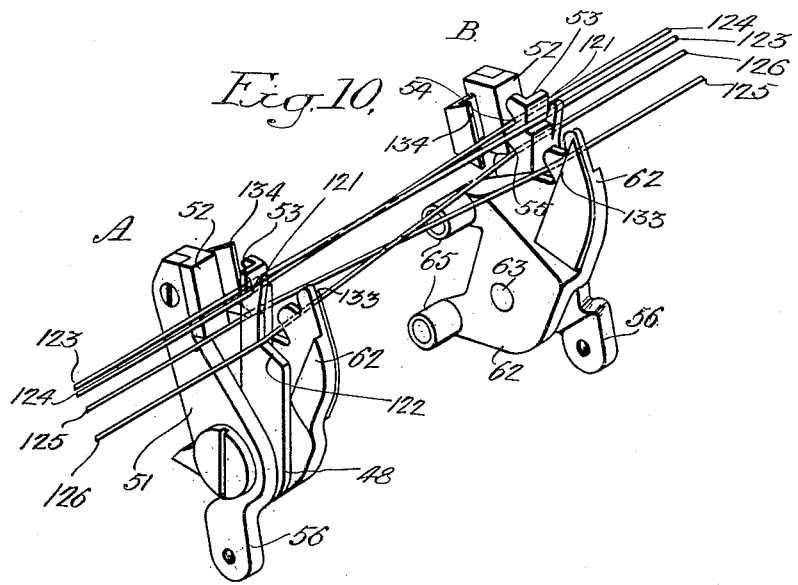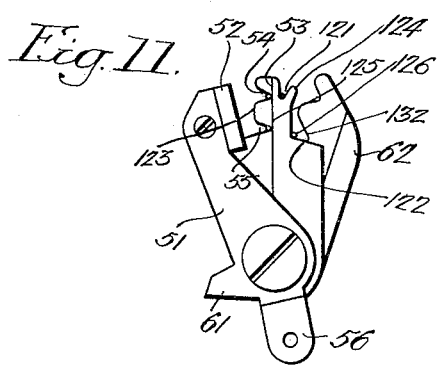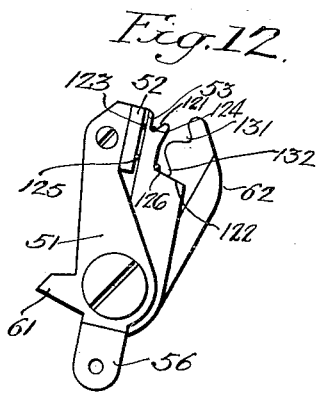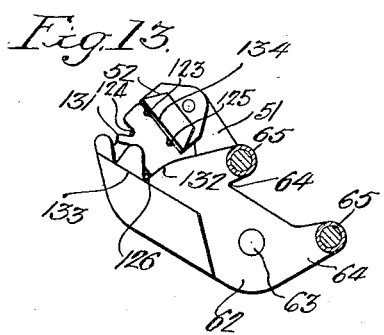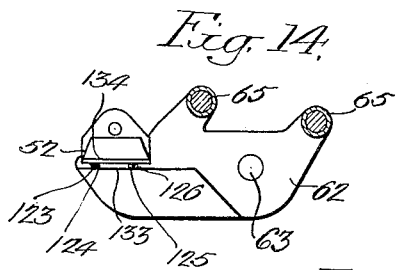

Patented Mar. 25, 1930

1,751,509

UNITED STATES PATENT OFFICE

JAMES CUNNINGHAM, OF RIVERTON, NEW JERSEY, ASSIGNOR, BY MESNE ASSIGNMENTS, TO AMERICAN TELEPHONE AND TELEGRAPH COMPANY, A CORPORATION OF NEW YORK

ELECTRIC SOLDERING MACHINE

Application filed March 30, 1927. Serial No. 179,647.

This invention relates to improvements in electric soldering machines, and the principal object of the invention is to provide a soldering machine of novel and improved form particularly adapted to splicing the individual wires of telephone and similar cables.

Another object of the invention is to provide novel means in a soldering machine of the stated type whereby a plurality of pairs of wires may be spliced in a single operation.

Another object of the invention is to provide novel means including a plurality of sets of wire-gripping elements movable successively into soldering position for increasing the production capacity of machines of the type involved.

The invention further resides in certain novel and advantageous details of construction as hereinafter set forth and as illustrated in the attached drawings, in which:

Figure 1 is a front elevation of a machine made in accordance with my invention;

Fig. 2 is a rear elevation of the machine;

Fig. 3 is a plan view of the machine;

Fig. 4 is a section on the line 4—4, Fig. 1;

Fig. 5 is a section on the line 5—5, Fig. 1;

Fig. 10 is a detached view in perspective of the wire-gripping and shearing elements;

Figure 6:
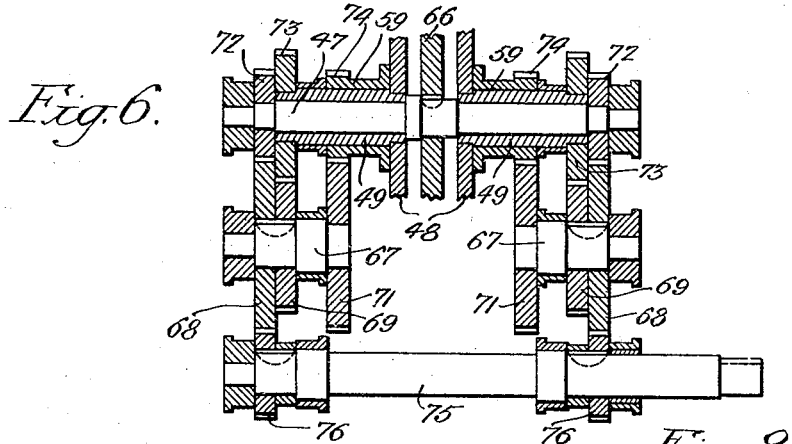
Fig. 6 is a section on the line 6—6, Fig. 4.

Figs. 11 and 12 are outside elevations of one of the sets of wire-gripping and shearing elements in progressive positions, and Figs. 13 and 14 are detached elevational views from the opposite side of the said sets of gripping and shearing elements illustrated in Figs. 11 and 12, and illustrating a still further progressive movement thereof in the normal operation of the machine.

With reference to the drawings, the machine comprises a base 1 and two side frames 2, 2 which extend upwardly from the base and between which are mounted, as hereinafter described, an electrically heated soldering iron 3 and in a position above the soldering iron a rotary wire-holding head 4.

To the upper end of each of the frame pieces 2 is secured a gear box 5, and extending transversely across the frames and journaled in the boxes 5 is a shaft 6, to the outer ends of which project beyond the sides of the boxes 5 is secured a substantially U-shaped yoke or handle 7, said handle extending upwardly as clearly illustrated and constituting means whereby the shaft 6 may be partially rotated for a purpose hereinafter described.

Referring to Figs. 4 and 5, it will be noted that the handle or lever 7 is provided with springs 8, 8 which attach to the frame or to the gear boxes 5, as indicated at 9, and normally and resiliently retain the lever in a normally retracted position.

Loosely suspended from the shaft 6 between the gear boxes 5 and the frames 2 and as shown in Figs. 2 and 5 is a pair of arms 11 which carry at their base a cross head 12 in which as best shown in Fig. 5 the soldering iron 3 is mounted so as to extend diagonally upwards and toward the front of the machine. In this manner, the soldering iron 3 is pivotally suspended from the shaft 6.

Extending forwardly from one of the arms 11 is an arm 13, see Fig. 5, at the forward end of which is a roller 14, and this roller is adapted to be operatively engaged by a cam 15 secured on the inner end of a shaft 16 journaled in the lower projecting portion of one of the gear boxes 5, as shown in Fig. 2. As shown in Fig. 4, the shaft 16 carries at its outer end a worm wheel 17 which meshes with a worm 18 on a vertical shaft 19 journaled and supported in bearings 21, 21 on the lower end of the gear box 5. The shaft 19 has at its lower end a spur gear 22 which as best shown in Fig. 1 meshes with a gear 23 journaled on the under side of the frame extension 24, and this gear 23 in turn meshes with a gear 25 on the lower end of a vertical shaft 26. This shaft which is journaled in the frame extension 24 and in a yoke 27 mounted on said frame carries at its outer end a worm wheel 28 which meshes with a worm 29 on the shaft of an electric motor 31 mounted on said frame extension 24. It will be apparent that through the intermediate transmission elements described above the cam 15 is actuated from the motor 31 to periodically elevate the soldering iron from the normal position shown in Fig. 5 to an elevated position as hereinafter described.

Figures 7, 8:
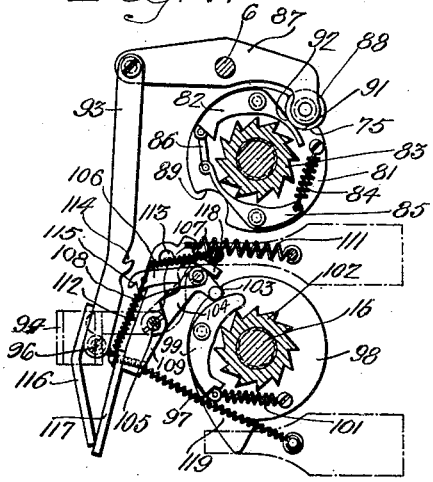
Fig. 7 is a section on the line 7—7, Fig. 2.
Fig. 8 is a section on the line 8—8, Fig. 2.

Secured to the shaft 16 in the lower extension of the gear box 5 is a cam 32, see Figs. 2 and 8, and cooperating with this cam is a roller 33 at the lower end of a lever arm 34 attached to the outer end of one of the trunnions 35 of a yoke 36 which as illustrated in Figs. 1 and 5 is journaled transversely between the side frames 2. The arms 37 of the yoke project rearwardly one on either side of the soldering iron 3 and have pivotally secured to their rear connected ends a pair of pivotally mounted and opposed dogs 38, see Fig. 2, which enter opposite sides of a slot 39, see Fig. 5, in a duct 41 which is clamped at the rear of the machine in a substantially vertical position by means of a series of clamps 42. The duct as shown in Fig. 5 extends forwardly and over the head 4, the forward end of the duct as shown in Fig. 1 occupying a central recess in the head and extending downwardly at the front of the machine to a point more or less corresponding with elevated position of the tip 43 of the soldering iron 3 when the latter is in the elevated position, as hereinafter set forth.

The duct 41 is divided, and the upper section thereof which passes over the head 4 is pivoted at its lower end through the medium of the clamp 42 at that point which is mounted and turns on the shaft 6. This provides for elevation of the upper end of this duct section for a purpose hereinafter set forth. A spring 40 attached to the clamp 42 and to the frame, as shown in Fig. 4, resiliently holds the upper end of the duct in a normal depressed position.

The duct 41 constitutes a guide passage for a soldering strip, and the dogs 38 are so mounted as to normally bear against the opposite sides of said solder strip within the duct 41. A spring 44 is secured to the dogs in such manner as to resiliently hold them against the solder. The arrangement is such that when the rear end of the yoke carrying the box moves downwardly, the dogs pass freely over the sides of the solder strip which is held stationary in the tube 41 by friction and the dog 50. On the upward movement of the yoke, however, the dogs 38 come together after the manner of a toggle and bite into the solder in such manner as to advance the solder strip in the duct to an extent corresponding with the movement of the yoke. A third spring tensioned dog 50 holds the solder strip during return movement of the feeding dogs.

In Fig. 5, the solder strip is not shown within the duct 41, and the inner end of one of the dogs 38 which is visible through the slot 39 is shown serrated or grooved in order to more positively grip the solder when the yoke moves up.

It will be noted by reference to Fig. 5 that the yoke 36 and the arms 37 are normally held in an elevated position by means of springs 45 attached one to each of the arms 37 and to the inner faces of the gear boxes 5. Also a spring 46 resiliently holds the lever 34 attached to the yoke trunnion upwardly so that the roller 33 thereon is in continuous contact with the face of the cam 32. Under these circumstances, rotation of the shaft 16 in the manner previously described results in a periodic oscillation of the yoke 36 and the arms 37 resulting in an intermittent advance movement of the solder in the duct.

Figure 9:
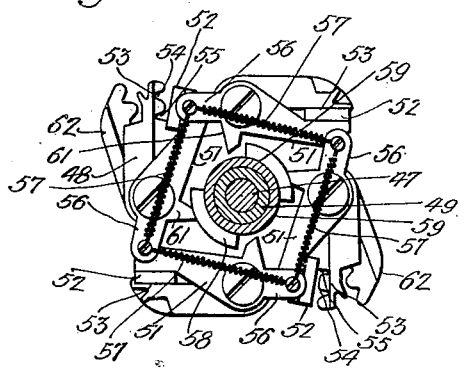
Fig. 9 is a section on the line 9—9, Fig. 1.

The rotary head 4 is mounted on a transverse shaft 47 journaled in the gear boxes 5, 5 and comprises a pair of plates 48 secured respectively to sleeves 49, 49, see Fig. 6, loosely mounted on the said shaft 47. To the outer faces of each of the plates 48 are secured four gripping levers 51 having flat gripping heads 52 which cooperate as shown in Figs. 9 to 14 inclusive with opposed shoulders 53 on the plates 48. Adjacent each of the shoulders 53 the plates are formed with recesses 54 and 55 whose function as hereinafter more fully described is to locate the wires to be spliced so that the latter may be gripped in spaced relation between the shoulder 53 and the head 52. The gripping levers 51 have rear extensions 56 which are connected as shown in Fig. 9 by springs 57 which exert a resilient pressure tending to advance the gripping heads 52 of the levers against the shoulders 53. The levers 51 are actuated through the medium of cam projections 58 on sleeves 59 loosely mounted on the sleeves 49, as shown in Figs. 6 and 9, which are engaged by projections 61 on the said levers, also as shown in Fig. 9, whereby as the head rotates the levers are periodically oscillated to draw the clamping heads 52 away from the shoulders 53 and to permit advancement of the heads against the shoulders through the medium of the springs 57.

Also as shown in Figs. 9 to 14, inclusive, the rotary head 4 comprises sets of shearing arms 62, these arms being pivotally mounted on the inner faces of the plates 48 and in the present instance on the same pivot elements 63 on which the arms 51 are mounted on the outside of said plates. The arms 62 correspond in number with the arms 51, and each of the arms 51 forms with its associated arms 62 and with the plates 48 independent sets of wire-gripping and shearing elements functioning in a manner hereinafter described.

As shown in Fig. 5, each of the arms 62 has a transverse projection 64 carrying rollers 65 which engage a cam 66 fixed to the shaft 47 as shown in Fig. 6. Through the medium of this cam the arms 62 are oscillated about the pivot 63 to intermittently bring the outer ends thereon into operative shearing engagement with those portions of the plates 48 in which the wires are held, as hereinafter more fully described.

It will be noted from Fig. 6 that the shaft 47 and the sleeves 49 and 59 are independently rotated through transmission gearing mounted in the gear boxes 5, 5. In each of the gear boxes is journaled a stub shaft 67, each of which carries three gears 68, 69 and 71. The gear 68 meshes with pinions 72 secured to the opposite ends of the shaft 47. The gear 69 in each instance meshes with a gear 73 secured respectively to the sleeves 49, while the gear 71 meshes in each instance with pinion 74, one on each of the sleeves 59. Rotation of the stub shaft 67 accordingly results in a simultaneous but differential movement of the shaft 47 and the sleeves 49 and 59. The stub shafts 67 are actuated through a shaft 75 journaled in the gear boxes and having thereon gears 76 which mesh respectively with the gears 68. The shaft 75 projects at one end beyond the gear boxes and has secured to the projecting end thereof as shown in Fig. 4 a worm gear 77 which meshes with a worm 78 on the worm shaft 19, which as previously set forth is connected through suitable transmission with the motor 31.

The shafts 16 and 75 are operated in timed relation, and since this relation involves independent and alternate rotation of the shafts, clutches are provided between the gears 17 and 77 and the shafts on which they are mounted. The shaft 75 has secured to its outer end a disk 81 which has on the inner face thereof a pivoted pawl 82 adapted to engage the ratchet wheel 83 secured to the outer face of the worm wheel 77. A spring 84 on the disk anchored to a pivoted lever 85 and a link 86 which connects the lever 85 to the pawl 82 tend to retain the pawl in the ratchet-engaging position.

Mounted on the outer end of the shaft 6 is a lever 87 having at its inner end a roller 88 adapted to engage in recesses 89 and 91 in the periphery of the disk 81, as shown in Fig. 7, and when this roller occupies the recess 91, it engages a rear extension 92 on the pawl 82 and shifts the pawl out of engagement with the ratchet, as illustrated. Similarly when the roller occupies the recess 89, the pawl is disconnected from the ratchet by engagement of the roller with the forward end of the lever 85.

Depending from the outer end of the pivoted lever 87 is a rod 93 which rests in back of a yoke 94 attached to the fixed frame of the machine. The yoke 94, as shown in Fig. 4, has an upturned shoulder 95 which in a predetermined extended position of the rod 93 is engaged by a pin 96 on the said arm whereby the arm is positively supported in an elevated position in which the roller 88 occupies one or other of the recesses 89 or 91. A spring 97 attached to the lower end of the arm 93 functions to hold the arm inwardly in a position in which the pin 96 avoids the shoulder 95. The shaft 16 has secured to the outer end thereof a disk 98 which carries on its inner face a pivoted pawl 99 which is normally retained by a spring 101 in a position operatively engaging a ratchet wheel 102 secured on the outer face of the gear 17. The disk 98 has in its periphery a recess 103 into which is adapted to fit a projecting portion of a detent 104 which is mounted on a pivot pin 105 secured in the frame of the machine. When the detent 104 occupies the recess 103, it engages the rear end of the pawl 99 and oscillates the pawl out of contact with the ratchet 102, as shown in Fig. 7.

Pivotally secured to the detent 104 and extending rearwardly therefrom is a pawl 106 which has a shoulder 107 adapted to engage a reverse shoulder 108 upon a lever 109 pivotally mounted on the pivot pin 105. This lever is normally held in a forward position at the top by means of a spring 111, and when the shoulder 107 of the pawl 106 is engaged by the shoulder 108 on said lever, the detent 104 is held in an advanced position, causing it to enter the recess 103 in the disk 98 when the said recess has moved into the position shown in Fig. 7. While the pawl 104 occupies the recess 103, movement of the disk 98 is prevented, but when the pawl 106 is elevated so as to be released from the shoulder 108, the pressure on the detent 104 tending to hold it in the recess 103 is released whereby the disk is free to advance. It will be noted that the pawl 106 is resiliently held in a normal position unchangeable by the shoulder 108 by means of a spring 112. A second spring 113 connected to the pawl 106 and to the frame of the machine tends at all times to hold the detent 104 in a forward position lightly engaging the periphery of the disk 98.

The rod 93 has an upturned notch or recess 114 which is adapted to engage under the hooked extremity 115 of the pawl 106, and when the pawl and the rod are thus interlocked, elevation of the rod from a depressed position results in the elevation of the pawl 106 and disengagement of the shoulders 107 and 108. This as previously described releases the detent 104 and permits the disk 98 to turn.

It will be noted also with reference to Fig. 7 that the lower end of the rod 93 has an inturned extreme portion 116 which is engaged by the lower end 117 of the lever 109 whereby when the upper end of this lever is in the forward position which it occupies when the pawl 115 is released from the shoulder 108, the arm 93 is forced rearwardly to an extent engaging the pin 96 with the shoulder 95, thereby retaining the arm when elevated as hereinafter described in an elevated position.

The upper end of the lever 109 has an inturned projection 118 which projects in towards the periphery of the disk 98, and the disk 98 carries a cam 119 which projects at one point beyond the periphery of the disk, as shown in Fig. 4. As the disk rotates, this cam engages the inturned end 118 of the lever 109 and forces the latter backwardly at the top around the pivot 105 to an extent insuring re-engagement of the shoulders 107 and 108 on the lever 109 and the detent 106, assuming, of course, that these shoulders are disengaged.

In Figs. 10 to 14, inclusive, I have illustrated the operation of the wire-gripping and shearing devices. As previously described, the rotary head 4 comprises eight independent sets of gripping and shearing elements which operate in pairs. These sets of elements are moved successively in a manner hereinafter described into an operative position in which they hold the wires to be spliced, which latter have previously been inserted in the gripping elements in a position to be operated on by the soldering iron. In Fig. 10 is shown one of the cooperating sets of elements which occupy the positions in which both the shears and jaws are open for the reception of wires to be spliced. As previously set forth, those parts of the plate 48 which cooperate with the gripping arms 51 and the shearing blades 62 are provided with a pair of recesses 54 and 55, and the plates are also provided with a recess 121 and a shoulder 122. Each of the recesses 54, 55, 121 and the shoulder 122 is adapted for reception of the wires to be spliced, and the recesses are so arranged relative to each other that the device is adapted for splicing two sets of wires in a single operation. Thus it will be noted with particular reference to Figs. 10 to 14, both inclusive, that the recesses 54 and 121 are oppositely arranged as also are the recesses 55 and the shoulder 122. In inserting the wires in the head therefore and as shown in Figs. 10 and 11, one pair of wires to be spliced which I may designate by the reference numerals 123 and 124 respectively is inserted in the recesses 54 and 121, while the second pair of wires 125 and 126 is inserted in the recesses 55 and the shoulders 122.

In order to clarify the description of this portion of the apparatus, I may designate the respective sets of gripping and shearing elements illustrated in Fig. 10 A and B. It will be noted that the wire 123 occupies the recess 54 of the set A and the recess 121 of the set B, while the wire 124 occupies the recess 121 of the set A and the recess 54 of the set B. With this arrangement, it will be noted that the wires cross midway between the sets A and B and substantially in a vertical plane which includes the tip of the soldering iron. Similarly the wire 125 occupies the recess 55 in the set A and lies on the shoulder 122 of the set B, while the wire 126 occupies the recess 55 of the set B and the shoulder 122 of the set A, these wires also crossing substantially midway between the sets A and B. It will be noted, however, that the two sets of wires 123 and 124 and 125 and 126 are spaced from each other and do not come in contact in the space intermediate the sets A and B.

Referring to Fig. 1, it will be noted that at the top of each of the gear boxes 5 at the front of the machine is a flange 127 which carries a clamping element 128 behind which the wires may be inserted so as to be held taut between the sets of elements A and B so that when inserted in the recesses 54 and 55 and 121 and on the shoulder 122, they may be held in their proper relative positions and be prevented from accidentally dropping or falling from the recesses.

Following insertion of the wires in the recesses as described above, the head 4 rotates, and in such rotation the gripping arms 51 of the sets A and B are actuated to move forwardly so as to confine or grip the wires 123 and 125 against the shoulder 53.

In Fig. 11, the set of elements A is shown in the relative positions which they occupy when the wires are inserted as shown in Fig. 10. With the rotation of the head 4, the arm 51 is advanced until as shown in Fig. 12, it grips the wires 123 and 125 against the shoulder 53. Further rotation of the head results in an inward movement of the shearing blades 62, with the result that the ends of the wires are severed. Thus in each of the sets A and B, those of the wires which occupy the recesses 121 and which rest upon the shoulder 122 are severed by the shearing action of the blades 62, which advance as shown in Figs. 13 and 14. In the set A for example, the wires 124 and 126 are severed at a point immediately adjacent or inside the recesses 121 and the shoulder 122, while in the set B the wires 123 and 125 are severed at the corresponding points. It will be noted that each of the blades 62 is provided at its forward or cutting edge with a pair of recesses 131 and 132 which when the blades move forwardly register more or less accurately with the bases of the shoulders 122 and the recesses 121 so that the wires are confined and are held accurately between the shearing edges. Following the shearing of the wires, the ends of the latter are carried inwardly until they rest alongside the respective companion wires to which they are spliced, being confined between a transverse shoulder 133 on the blades 62 and the forward edge of a flange 134 on the arm 51.

In Fig. 13, the blade is advanced to the point of shearing the wire 126, while in Fig. 14, the severed ends of the wires are shown clamped between the shoulder 133 and the flange 134 as rescribed.

It will be noted that when the wires are inserted, the clamping and shearing elements occupy substantially vertical positions, and that when the shearing action has been completed and the wires are clamped together in pairs, as shown in Fig. 14, the elements have moved into a substantially horizontal position holding the wires in a position directly over the tip 43 of the soldering iron. When the solder iron is elevated as previously described, it is brought into contact with the under side of both sets of wires. Under these conditions also the solder strip in the duct 41 has been advanced from the end of the tube so that it contacts with the upper side of the wires.

The operation of the machine is as follows: With the parts in the position shown in the drawings, the clutches on the shafts 16 and 75 are released, and while the motor is running, the other parts of the mechanism are inoperative. The operator first inserts the wires as shown in Fig. 10 and as described in detail above, and thereafter drawn the handle 7 rearwardly, with the result that the arm 87 is rocked and the roller 88 elevated from the recess 91 in the disk 81. Elevation of the roller 88 from the recess not only releases the disk but also operatively connects the disk through the pawl 82 with the ratchet 83 on the worm wheel 77, which as previously described is loosely mounted on the shaft 75. The gear is continuously rotated from the motor through the worm 78, and as a consequence of the clutch action of the pawl 82 and ratchet 83, the shaft 75 is rotated and continues rotation until the roller 88 on the lever 87 enters the recess 89 at the opposite side of the disk, this resulting in a retraction of the pawl 82 from the ratchet 83 and release of the shaft 75 from the driving parts.

As previously described, the shaft 75 is connected through the gear mechanism in the in the boxes 5 with the rotary head 4 which carries the wire-gripping and shearing parts, and the gearing is such that the 180° rotation of the shaft 75 results in a 90° angular movement of the head, in which the gripping and shearing parts are carried, from the vertical position of Fig. 11 to the substantially horizontal position of Fig. 14. During this movement of the head 4, the wires are sheared and gripped in a position as shown in Fig. 14, which as previously described prepares them for the soldering operation.

When the roller 88 enters the recess 89 and thereby interrupts the movement of the shaft 75, the lever 87 is oscillated so that the depending arm 93 is elevated. In this upward movement of the arm 93, the shoulder 114 on the latter engages the projecting end 115 of the pawl 106, elevating the pawl so that the shoulder 107 thereon is released from behind the shoulder 108 on the lever 109. This has the effect of releasing the detent 104 from the recess 103 in the disk 98, which in turn results in the engagement of the pawl 99 on the disk 98 with the ratchet 102 on the gear 17, which is loosely mounted on the shaft 16 and is continuously actuated through the worm 18 from the motor. The shaft 16 accordingly is set in operation. It will be noted that when the arm 93 is elevated as described, the pin 96 thereon engages in back of the shoulder 95 on the yoke 94, with the result that the arm 93 is positively supported in the elevated position and manual operation of the handle 7 prevented. Rotation of the shaft 16 results first in a movement of the yoke 37 through the arm 34 and the cam 32 which advances the solder in the duct 41 so that solder projects beyond the end of the duct and engages the wires which are held as previously described in the soldering position in the rotary head 4. Rotation of the shaft 6, which occurs when the soldering iron is elevated as set forth below, results in an elevation of the forward end of the solder duct, and under these conditions the solder is presented first to the wires 125 and 126 occupying the inner position in the clamping elements. The rotation of the shaft 16 results, through the medium of the cam 15, in elevation of the electric solder iron so that the tip comes into contact or closely adjacent the wires 123, 124, 125, and 126. The heat from the soldering iron melts the solder, which is of the type containing a flux so that the solder flows over the wires. As the solder melts, the duct 41 which was elevated as described drops, and in doing so the end of the duct moves out towards the wires 123 and 124 so that an even distribution of the solder is obtained over both sides of the wires 123—124 and 125—126 respectively. Before a complete rotation of the shaft 16 is accomplished, the cam 15 operates to release the iron 3, which drops to the normal inoperative position shown in the drawings. It will be noted that before the complete rotation of the disk 98 is accomplished, the cam projection 119 on the disk 98 engages the inturned end 118 of the lever 109, and oscillates this lever to an extent re-engaging the shoulders 107 and 108 on the detent 104 and the lever 109, and thereby prepares the detent 104 for entering the recess 103 in the disk 98 when the disk has completed its full rotation, thereby locking the disk and releasing it and the shaft 16 to which it is secured from the gear 17. Oscillation of the lever 109 under the action of the cam 119 also releases the lower end 116 of the depending arm 93 from engagement with the lower projecting end 117 of the lever 109 and permits the arm 93 to move forward under the action of the spring 97 to an extent releasing the pin 96 from the shoulder 95 and thereby releasing the arm 93 so that the lever 87 may be again oscillated through the medium of the handle 7. The cycle therefore is repeated by returning the parts to their normal positions as illustrated in the drawings, whereupon additional wires for splicing may be inserted in the rotary head as described and the cycle repeated by retracting the handle 7. It will be understood that following the completion of the soldering or slicing operation, the soldered wires are withdrawn from the gripping parts which in the continued rotation of the head 4 are opened by their actuating cams to permit withdrawal of the wires.

I claim:

1. In a wire-splicing machine, the combination with a frame, of a soldering iron mounted in said frame, a plurality of wire-gripping elements, and means for moving said gripping elements to bring the wires held thereby successively into position to be acted upon by said soldering iron.

2. In a wire-splicing machine, the combination with a frame, of a soldering iron mounted in said frame, a plurality of wire-gripping elements, means for moving said gripping elements to bring the wires held thereby successively into position to be acted upon by said soldering iron, and solder feeding means operatively associated with said wire-gripping elements.

3. In a wire-splicing machine, the combination with a soldering iron, of a rotary head including a plurality of independent wire-gripping elements, and means for rotating said head to bring the wires held by said gripping elements successively into a position to be acted on by said soldering iron.

4. In a wire-splicing machine, the combination with a rotary head including a plurality of independent sets of wire-gripping elements, a soldering iron normaly supported in a position retracted from said head, means for rotating the head to bring the wires held by said gripping elements successively into position to be operated on by said soldering iron, and means for periodically elevating the soldering iron to bring it into operative position with respect to said wires.

5. In a wire-splicing machine, the combination with a soldering iron, of wire-gripping and retaining jaws movable to bring the wires retained therein into a position to be operated on by said iron, and means for automatically opening the jaws to receive and to release the wires and for closing the jaws upon the wires after insertion to retain the latter during the soldering operation.

6. In a wire-splicing machine, the combination with a soldering iron, of wire gripping means movable periodically to bring wires held thereby into position to be operated on by said soldering iron, and means for periodically advancing the soldering iron from a normal retracted position into an operative position with respect to the wires held by said gripping means.

7. In a wire-splicing machine, the combination with a soldering iron, of a rotary head comprising a plurality of independent sets of wire gripping elements, means for intermittently actuating said head to bring the said sets of gripping elements successively into a position presenting wires retained thereby to the soldering iron, and means for intermittently opening the gripping elements to receive and to release the wires.

8. In a wire-splicing machine, the combination with a soldering iron, of a rotary head comprising a plurality of sets of wire-gripping elements operative in pairs to hold wires together in position to be united, and means for rotating the head to bring the wires retained by said elements successively into a postion to be operated on by said soldering iron.

9. In a wire-splicing machine, the combination with a soldering iron, of wire-gripping means comprising a pair of cooperating sets of wire-gripping elements, and means for moving said elements to bring the wires retained thereby into a position to be operated on by said soldering iron.

10. In a wire-splicing machine, the combination with a soldering iron, of wire retaining means including two sets of wire-gripping jaws located transversely at opposite sides of said soldering iron, and means for periodically moving said jaws to bring wires held thereby into a position to be operated on by said soldering iron.

11. In a wire-splicing machine, the combination with a soldering iron, of a cooperating pair of wire gripping jaws adapted to retain a pair of wires in position to be operated on by said soldering iron, and shearing means operatively associated with each pair of jaws and adapted respectively to sever the ends of different ones of said pair of wires held by said jaws.

12. In a soldering machine, the combination with a soldering iron, of two cooperating and spaced pairs of jaws adapted to retain the ends of a pair of wires in overlapping relation and in a position to be operated on by said soldering iron, and shearing means operatively associated with each of said pairs of jaws and adapted respectively to sever different ends of the pair of wires held by said jaws to accurately limit the lengths of the overlapping ends of said wires.

13. In a soldering machine, the combination with a soldering iron, of wire-gripping means comprising cooperating sets of wire-gripping elements movable periodically into an operative position with respect to said soldering iron, shearing elements operatively associated with each of said sets of gripping elements, and means automatically operative for actuating said elements to first grip a pair of wires inserted between said elements, and thereafter to shear the ends of said respective wires so that a predetermined length thereof is retained in overlapping relation.

14. In a wire-splicing machine, the combination with soldering iron, of a rotary head comprising a plurality of independent sets of wire-gripping elements movable successively into an operative position with respect to said soldering iron, and cam means for actuating said elements to periodically grip and release wires inserted therein.

15. In a wire-splicing machine, the combination with a soldering iron, of a rotary head comprising a plurality of independent sets of wire-gripping elements movable successively into an operative position with respect to said soldering iron, and cam means movable with said head for periodically actuating the elements to grip and release wires inserted therein.

16. In a wire-splicing machine, the combination with a soldering iron, of a rotary head including a plurality of independent sets of wire-gripping elements movable into an operative position with respect to said iron, and means for actuating said gripping elements including rotary cams concentric with said head but differentially movable with respect to the latter.

17. In a wire-splicing machine, the combination with an operable soldering iron, of a rotary head including a plurality of independent sets of wire-gripping jaws, cam means for actuating said jaws, a shearing element operatively associated with each of said sets of jaws, independent cam means for actuating said shears, and a mechanism for moving the iron in timed relation with the movement of said head for applying the heat in a movement subsequent to the movement of said shears.

18. In a wire-splicing machine, the combination with a soldering iron, of a rotary head including a plurality of independent sets of wire-gripping elements movable successively into an operative position with respect to said iron, means for actuating said gripping elements, wire-shearing means operatively associated with each of said sets of gripping elements, and means for actuating said shears.

19. In a wire-splicing machine, the combination with a soldering iron, of a rotary head including a plurality of independent sets of wire-gripping elements, means for actuating the said gripping elements, and mechanism for intermittently rotating the head to bring the gripping elements successively into an operative position with respect to said iron.

20. In a wire-splicing machine, the combination with a soldering iron, of a rotary head including a plurality of independent sets of wire-gripping elements, means for intermittenly rotating the head to bring the said elements successively into an operative position with respect to said iron, and means for opening and closing said gripping elements at predetermined points in the movement of said head.

21. In a wire-splicing machine, the combination with wire-gripping elements including means for retaining a pair of wires in overlapping relation, of means automatically operable for applying heat to the overlapped wires, and means for severing predetermined wires retained by said gripping means preceding the operation of the second mentioned means.

22. In a wire-splicing machine, the combination with a soldering iron, of a rotary head comprising a plurality of independent sets of wire-gripping elements adapted to be moved successively into operative relation with respect to said iron, each of said sets of gripping elements including a relatively fixed part having a plurality of wire-receiving recesses, and a relatively movable gripping element adapted to engage the said wires and to retain them in said recesses.

23. In a wire-splicing machine, the combination with a soldering iron, of a rotary head comprising a plurality of independent sets of wire-gripping elements adapted to be moved successively into operative relation with respect to said iron, each of said sets of gripping elements including a relatively fixed part having a plurality of wire-receiving recesses, a relatively movable gripping element adapted to engage the said wires and to retain them in said recesses, and a shearing element operatively associated with each of said sets of gripping elements and adapted to operate upon the wires occupying certain of said recesses.

24. In a wire-splicing machine, the combination with a rotary member including a plurality of independent wire-gripping elements adapted to move progressively into a normal operative position, a soldering iron normally supported in a retracted position, mechanism for advancing the soldering iron into the aforesaid operative position in timed relation with the movement of said rotary member, and a solder feeding device operatively associated with the member and adapted to feed solder to the said operative position in timed relation with the movement of said rotary member and said soldering iron.

25. In a wire-splicing machine, the combination with a rotary head including a plurality of independent sets of wire-gripping elements, a shaft operatively connected with said head, a soldering iron operatively associated with said head, solder-feeding means operatively associated with the said head and with the soldering iron, a second shaft operatively connected with the soldering iron and with the solder-feeding means, a motor operatively connected with both of said shafts, and clutch means provided for actuating the shafts from the motor in timed relation to bring the wire-gripping parts successively into an operative position with respect to said iron to periodically shift the iron into operative relation with said gripping means and to feed the solder to the soldering position.

26. In a wire-splicing machine, the combination with wire-gripping means adapted for retaining a pair of wires in overlapping contiguous relation, of a soldering iron, and a common actuating means for relatively manipulating said gripping means and said iron to bring the latter into operative relation with respect to said overlapping wires.

27. In a wire-splicing machine, the combination with wire-gripping means adapted for retaining a pair of wires in overlapping contiguous relation, of rotatable means for moving said gripping means in a predetermined path, heating means, and automatically operable means for imparting movement to said heating means in synchronism with the movement of said gripping means to apply heat to the overlapping wires in a predetermined position of the latter.

28. In a wire-splicing machine, the combination with wire-gripping means adapted for retaining a pair of wires in overlapping contiguous relation, of a mechanism operable for feeding solder to the overlapping parts, and means operable in timed relation to the operation of said mechanism for applying heat to flow the solder.

29. In a wire-splicing machine, the combination with wire-gripping means adapted for retaining the overlapped ends of at least two pairs of wires, of a mechanism for feeding solder to the overlapping portions of both of said pairs of wires, and a mechanism operable in response to the operation of the first mentioned mechanism for applying heat to flow the said solder.

JAMES CUNNINGHAM.